Aug. 3, 1943. R. HIRSCHFELD Re. 22,360

GARMENT CONSTRUCTION

Original Filed June 18, 1942

INVENTOR
Rudolf Hirschfeld
BY
Black & Hirstenfeld
ATTORNEYS

Reissued Aug. 3, 1943

Re. 22,360

UNITED STATES PATENT OFFICE 22,360

GARMENT CONSTRUCTION

Rudolf Hirschfeld, New York, N. Y.

Original No. 2,309,955, dated February 2, 1943, Serial No. 447,509, June 18, 1942. Application for reissue April 13 1943, Serial No. 482,948

3 Claims. (Cl. 2—74)

My present invention relates generally to garments, and to certain improvements in a unitary woman's outer garment such as a dress especially.

In a woman's garment in which there is a relatively narrow waistband portion, it is customary to provide a slit or placket opening in the waistband region, usually at the side, to facilitate the passage of the garment over the bust or hips of the wearer when the garment is put on or taken off. A conventional construction utilizes buttons or similar elements, or a slide fastener, for the purpose of closing the placket opening after the garment has been put on.

A general object of the present invention is to provide an improved arrangement of parts in which a placket opening allows the waistband portion to expand as the garment is put on or taken off, but in which there is no necessity at any time for any slide fastener or other instrumentality for mutually securing the opposed edges of the placket opening along the full extent of the opening, although a slide fastener or other means for securing the edges of the opening together throughout more or less their whole lengths may be used if desired. In accordance with my invention, I provide a permanent but expansible interior seal for the placket opening in the form of a specially constructed pocket.

With this and other objects in view, it is a particular feature of the present invention to provide a pocket whose mouth is permanently secured to the opposed edges of the placket opening, whose lower edge lies substantially below the lower end of the placket opening, and whose inner edge may converge upwardly with respect to the side of the garment and merge with the latter at a point above the relatively narrow waistband portion of the garment. The two walls of the pocket thus define an expansible interior pleat which permanently seals the placket but which nevertheless allows the waistband portion of the garment to expand when necessary.

Under certain circumstances, it may be desirable to provide some sort of means for separably connecting at least some portions of the opposed edges of the placket opening after the garment has been put on. This connecting means may take the form of one or more buttons or equivalent fasteners but their function is not to seal the placket opening, and in fact these fasteners are preferably arranged in such manner that access to the pocket may be maintained at all times through the lower part of the placket opening.

In a preferred construction, the garment includes front and back sections which are joined together along a side seam, and the placket opening is arranged in alignment with the seam at the waistband region of the garment. Preferably, the pocket consists of front and rear walls the edges of which are stitched together everywhere except at a part of its outer edge where an opening is left to provide the mouth of the pocket, and the inner edge converges upwardly in a gradual manner toward the side seam, merging with the latter at a point above the waistband portion a short distance below the armhole.

I achieve the foregoing objects, and such other objects as may hereinafter appear or be pointed out, in the manner illustratively exemplified in the accompanying drawing, wherein—

Figure 1:
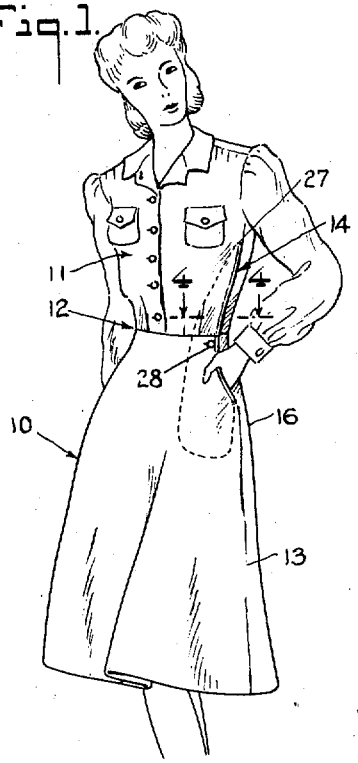
Figure 1 is a perspective view of a garment of the present character as it appears from the front when worn.

The garment I have chosen to illustrate is a woman's dress of unitary character, having a skirt portion 10 and an upper portion 11 permanently secured to each other. It will be noticed that the waistband portion 12 is substantially narrower than the bust and hip portions. It is this general type of unitary outer garment for which my present invention is intended.

In the illustrated garment, the construction involves front and back sections 16 and 18 joined by a side seam 13, this seam extending generally all the way from the bottom of the skirt to the armhole.

In the waistband region of the garment, at the side, I provide a placket opening 14 which, as is customary and necessary, extends both above and below the waist or narrowest part 12 of the garment. Where the garment has a side seam 13, this placket opening is arranged in alignment with or as an interruption in this seam.

Figure 4:
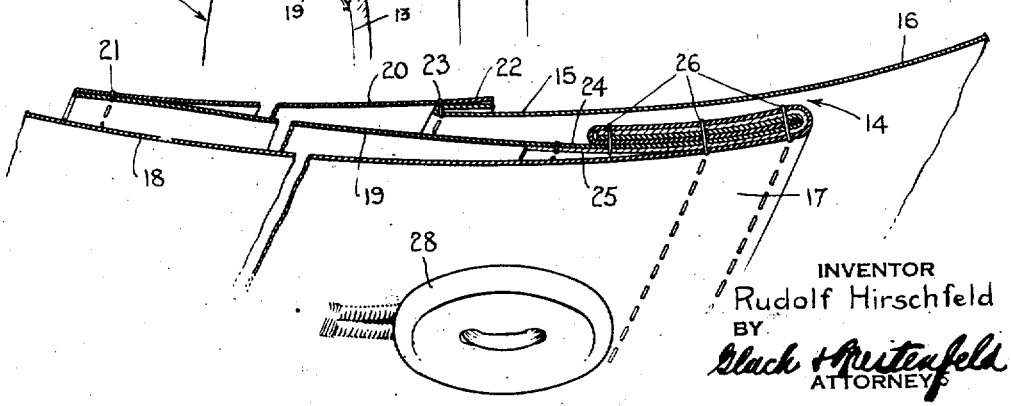
Figure 4 is an enlarged cross-sectional view taken substantially along the line 4—4 of Figure 1.

The rear edge of the placket opening is defined by the forward edge region 15 of the rear section 16 of the garment (see Figure 4), and the front edge of the placket opening is defined by the end edge portion 17 of the front section 18 of the garment. It is to be understood that Figure 4 is drawn on an enlarged and exaggerated scale.

In accordance with my invention, a special pocket element is associated with the garment for permanently sealing the placket opening on the inside. This pocket is composed of superimposed front and rear walls 19 and 20. The edges of these two walls are stitched together, as at 21, everywhere except at the mouth in the outer edge of the pocket. This outer edge is arranged in substantial alignment with the placket opening, and the two edges of the mouth are secured respectively to the opposed edges of the placket opening. That is to say, the outer edge portion 22 of the rear pocket wall 20 is stitched to the rear placket edge 15, as illustrated by the stitiches 23; while the outer edge portion 24 of the front pocket wall 19 is secured to the front edge of the placket opening. The attachment of the pocket edge portion 24 to the placket edge portion 17 preferably involves an interengagement of the parts as indicated in Figure 4, the various layers of material being permanently held together by rows of stitching 26.

Figure 2:
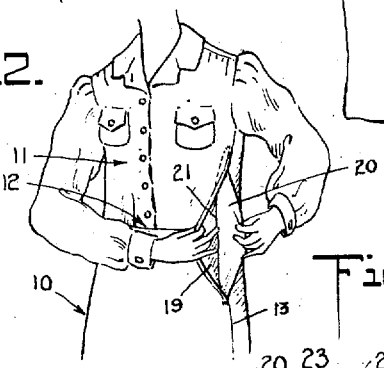
Figure 2 is a view similar to Figure 1 showing the waistband portion in the expanded condition it may assume when the garment is to be put on or taken off.

As a result of this association of the pocket with the placket opening, the placket opening is always in a sealed condition, preventing any access through this opening to the underside of the garment. For this reason, there is no necessity for any slide fastener or other means for sealing the edges of the placket opening along its full extent, as would be the case if the placket opening gave access to the underside of the garment. Nevertheless, the relatively narrow waistband portion of the garment is capable of expanding when the garment is pulled over the hips or bust of the wearer during the process of putting the garment on or taking it off. This expansibility is roughly indicated in Figure 2, and is permitted to take place by virtue of the unfolding of the pocket walls 19 and 20. These pocket walls serve as an interior pleat which imparts additional girth to the garment at the waistband portion whenever the garment is put on or taken off.

Figure 3:
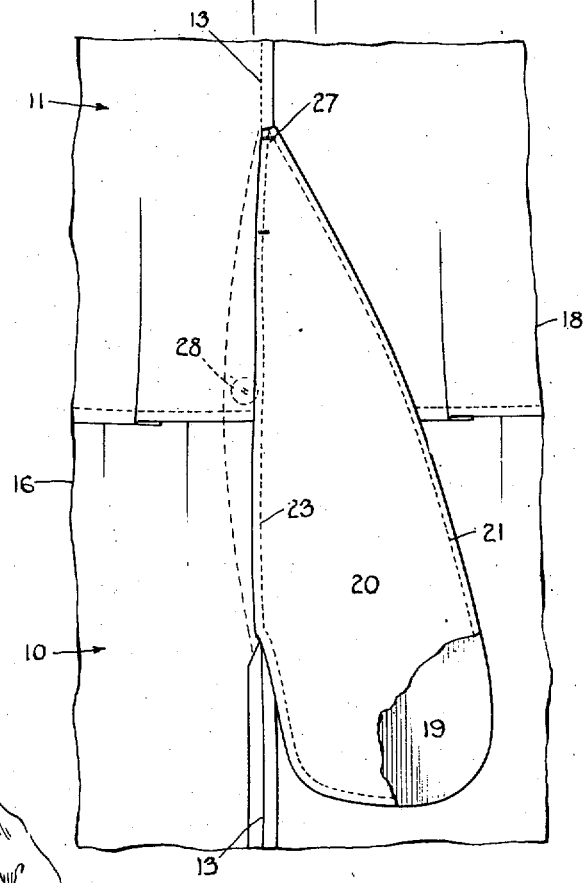
Figure 3 is an enlarged interior view of the present special pocket construction.

It will be observed that the inner edge of the pocket illustrated is inclined upwardly toward the side of the garment. Where the garment includes a side seam 13, this inner edge may thus converge upwardly with respect to this side seam, and merge with the latter at a point 27 slightly below the armhole. This upward inclination of the inner edge of the pocket construction allows the interior pleat to taper upwardly, i. e., the depth of the pleat diminishes gradually in an upward direction. This not only provides the maximum expansibility where it is most needed, viz., in the region of the waistband portion, but it also serves to retain the pocket in proper relationship to the garment, i. e., smooth or unwrinkled, whereby the parts readily assume the relationship shown in Figures 1, 3, and 4 after the garment has been put on.

It will also be observed that the lower edge of the pocket lies a substantial distance below the lower end of the placket opening 14. This helps the pocket to assume its proper position and also affords a reasonable amount of pocket space.

After the garment has been put on, the two opposed edges of the placket opening are separably connected at approximately the waistline by means of a fastener such as the button 28. This button is preferably carried by the rear section 16 of the garment, and a corresponding buttonhole is provided in or adjacent to the thickened and reinforced forward edge of the placket opening. The button 28, or equivalent fastening means, is preferably positioned a sufficient distance above the lower end of the placket opening to permit access to the pocket, as indicated in Figure 1. Additional buttons or fasteners, similar to the button 28, may be provided if desired, along the upper portion of the placket opening, but if the parts are properly designed and assembled, there is no necessity for such additional fasteners except possibly for ornamental purposes.

In my earlier Patent No. 2,075,395 I showed how a pocket could be associated with a pair of slacks or trousers to permit expansion of a relatively narrow waistband as the slacks were pulled upwardly over the hips. In such a waist-high garment, however, it is necessary to make some provision for properly supporting the inner edge of the pocket, and it is possible to provide such support because of the fact that access to the interior of the garment may be had from the upper edge of the slacks. In a full length unitary garment of the present character, I have found that the pocket will be properly positioned at all times if the pocket is caused to extend upwardly at least as far as the top of the placket opening, above the waistband, and is fastened to the garment at least as high up on the garment as the top of that opening, and that by causing the inner edge of the pocket to extend obliquely upward and to converge toward and merge with the side seam of the garment above the waistband region, in the manner herein described, adequate support is provided for the pocket with a minimum tendency for the pocket to fold or wrinkle and thereby destroy the smoothness or fit of the garment.

Obviously, the present pocket construction may be provided on either one or both sides of the garment.

In general it will be understood that the details herein described and illustrated may be modified by those skilled in the art without departing from the spirit and scope of the present invention as expressed in the appended claims.

Having thus described my invention and illustrated its use, what I claim as new and desire to secure by Letters Patent is:

1. In a unitary garment having a waist portion narrower than the bust and the hip portions, a placket opening in the waist band region extending both above and below the waist of the garment and a seal for said opening comprising a pocket the edges of the mouth of which are secured respectively to the opposed edges of said opening, the bottom edge of which lies substantially below the lower end of said placket opening, and which extends upwardly at least as far as, substantially, the top of said placket opening and is fastened to the garment at least as high up on the garment as, substantially, the top of said placket opening, said pocket thus defining an expansible interior pleat which closes said placket opening but which nevertheless allows the waistband portion to expand during the passage of the garment over the bust or hips of the wearer when the garment is put on or taken off.

2. In a unitary woman's garment having a waistband portion narrower than the bust and hip portions, a placket opening in the waistband region and at the side of the garment, and a seal for said opening comprising a pocket whose outer edges are permanently secured respectively to the opposed edges of said opening, whose bottom edge lies substantially below the lower end of said placket opening, and whose inner edge converges upwardly with respect to the side of the garment and merges with the latter at a point above the waistband portion of the garment, said pocket thus defining an expansible tapering interior pleat which permanently seals said placket opening but which nevertheless allows the waistband portion to expand during the passage of the garment over the bust or hips of the wearer when the garment is put on or taken off.

3. In a unitary woman's garment having a waistband portion narrower than the bust and hip portions, front and back sections connected by a side seam, a placket opening in the waistband region and in alignment with said seam, and a seal for said opening comprising a pocket whose outer edges are permanently secured respectively to the opposed edges of said opening, whose bottom edge lies substantially below the lower end of said placket opening, and whose inner edge converges upwardly with respect to said side seam and merges with the latter at a point above the waistband portion of the garment, said pocket thus defining an expansible tapering interior pleat which permanently seals said placket opening but which nevertheless allows the waistband portion to expand during the passage of the garment over the bust or hips of the wearer when the garment is put on or taken off.

RUDOLF HIRSCHFELD.